3,458,405
DISTILLATION SYSTEM WITH VERTICALLY
STACKED HORIZONTALLY INCLINED EVAPORATORS
John N. Akers, 1315 Robert Drive, Jackson, Miss. 39211
Continuation-in-part of application Ser. No. 320,407, Oct. 31, 1963. This application Apr. 22, 1966, Ser. No. 544,581
Int. Cl. C02b 1/06; B01d 3/28, 3/06
U.S. Cl. 202—236         5 Claims

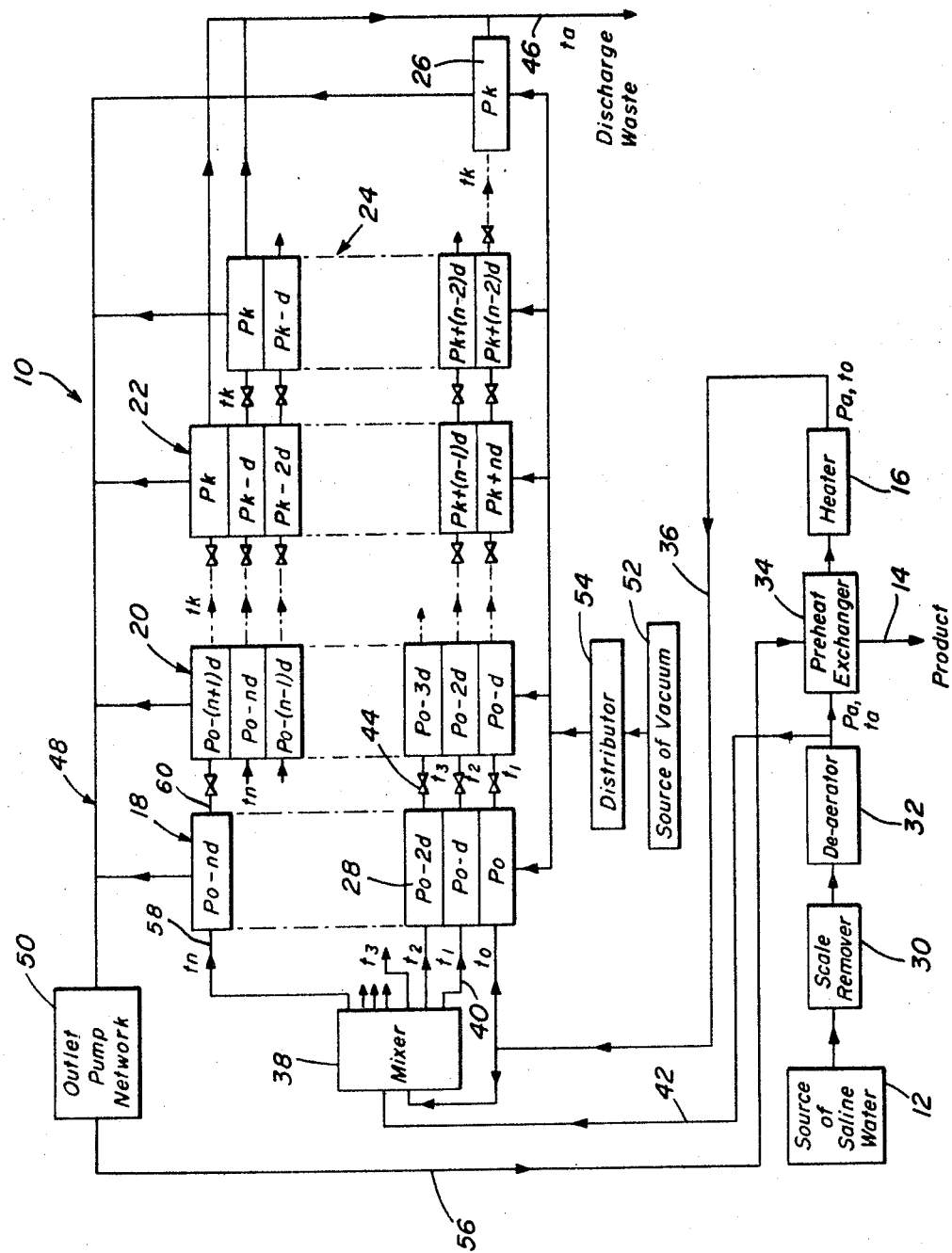

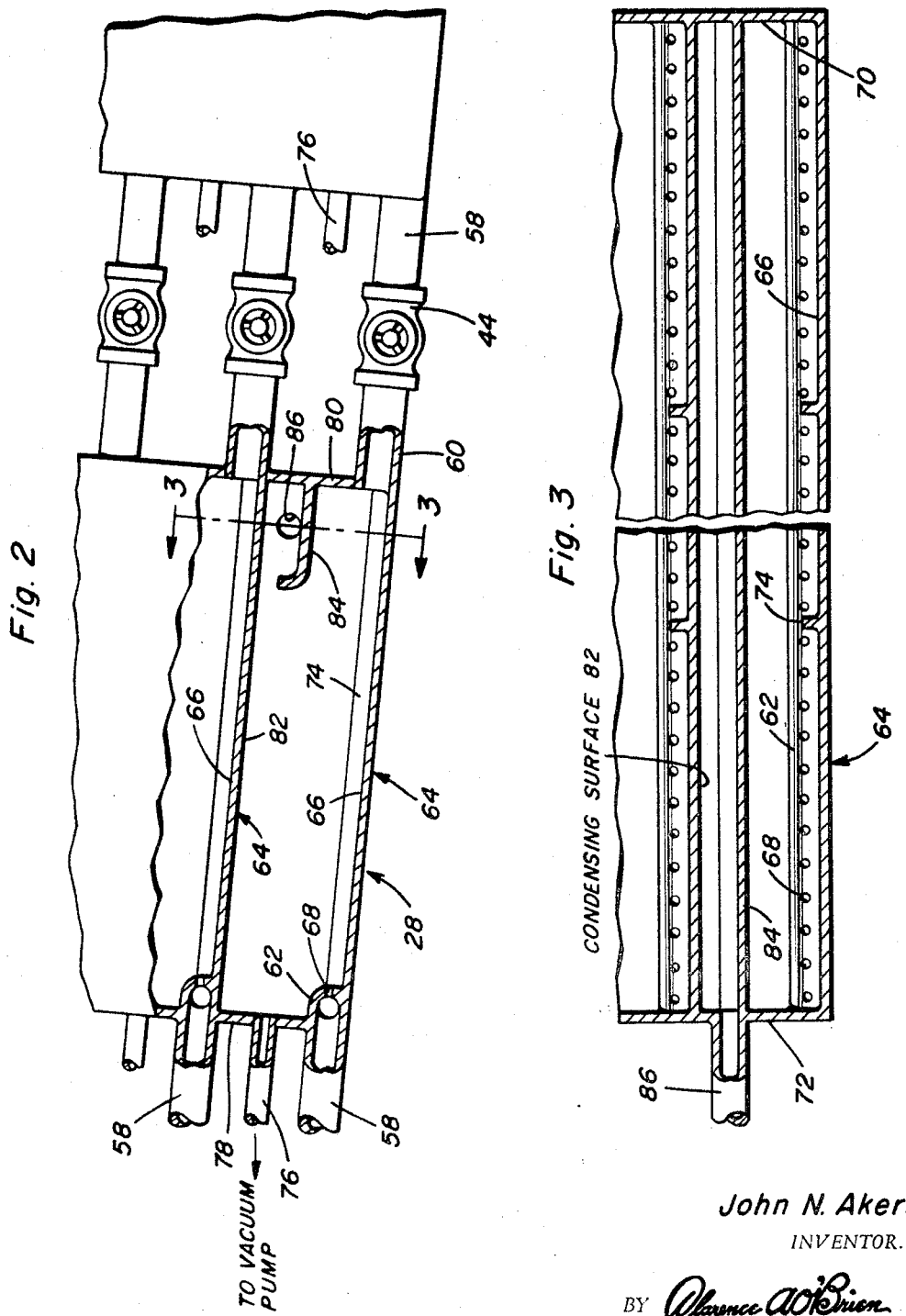

ABSTRACT OF THE DISCLOSURE

Saline water is heated and introduced at different temperatures to initial flash stages in a plurality of parallel flow paths, each flow path having series connected flash chambers of progressively decreasing pressure and corresponding boiling temperatures for successive partial evaporation of liquid flowing through each flow path. The flash chambers of different paths are vertically stacked in heat conductive relation to each other and inclined downwardly in the direction of flow to improve efficiency in the utilization of heat energy and pressure differentials to produce a potable condensate collected from each chamber.

---

This invention pertains to apparatus for distilling liquids and is a continuation-in-part of my prior copending application U.S. Ser. No. 320,407, filed Oct. 31, 1963, now Patent No. 3,275,530. More particularly, the present invention relates to a system for converting saline water into potable water.

A primary object of the present invention is to provide a system and apparatus for converting saline water into potable water in a relatively economical manner so as to effectively compete with most fresh water sources.

In accordance with the foregoing object, saline water is distilled by passage thereof through a plurality of pressure sealed chambers within which partial evaporation and condensation occurs similar to the system disclosed in Figure 4 of my prior Patent No. 3,275,530 aforementioned. The chambers are arranged in vertically stacked groups so that the saline water passes therethrough along parallel paths so as in the case of the arrangement shown in Figure 6 of my prior patent to most efficiently utilize heat energy which is supplied to the saline water prior to flow through said chambers according to the present invention. In this manner, more precise control over the fluid temperatures may be exercised. It is therefore an additional object of the present invention to provide a system wherein liquid is conducted in parallel paths through a plurality of series connected pressure sealed chambers within each path so that the liquid is introduced to each path at different boiling point temperatures corresponding to the different pressures maintained within the chambers.

A further object of the present invention in accordance with the foregoing object is to provide a system of pressure sealed, evaporation chambers through which a liquid is passed, and wherein predetermined pressure and heat transfer relationships are maintained between the chambers within each path and between the different paths.

A still further object of the present invention is to provide in connection with the system aforementioned, an evaporation and condensation chamber for partially evaporating a liquid and collecting the condensate thereof for removal as part of a product flow of potable water.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a simplified fluid flow diagram illustrating the system of the present invention.

FIGURE 2 is a partial side elevation view of a portion of the apparatus associated with the system shown in FIGURE 1.

FIGURE 3 is a partial sectional view taken substantially through a plane indicated by section line 3—3 in FIGURE 2.

Referring now to the drawings in detail, FIGURE 1 illustrates the system of the present invention generally denoted by reference numeral 10. In one form of the invention, the liquid is obtained from a source of saline water 12 such as sea water from which a potable water or distillate is obtained as an end product at the product discharge line 14. The raw saline water is initially heated by means of a heater 16 for example before it undergoes evaporation in a plurality of groups of pressure chambers such as the pressure chamber groups 18, 20, 22, 24 and the final pressure chamber 26. It will be apparent from FIGURE 1, that additional groups of pressure sealed chambers are operatively interposed between the groups 20 and 22, between the groups 22 and 24 and between the group 24 and final chamber 26. Each of the chambers 28 in the respective groups is similar in construction. It will therefore become apparent that after the saline water is elevated to an initial temperature ($T_o$) it is introduced into the initial chamber group 18 for subsequent flow through parallel paths extending through the other groups of chambers. However, before the raw saline water is heated, it undergoes initial treatment by passage through a scale remover unit 30, and a deaerator unit 32. Also, before the saline water is introduced into the heater 16, it is passed in heat exchange relation with the end product in the discharge line 14 by means of the preheat exchanger 34 so that some of the heat energy remaining in the end product may be utilized to initially elevate the temperature of the raw saline water before it is heated in the heater 16.

As shown in FIGURE 1, the saline water under atmospheric pressure $P_a$ is elevated from a temperature $T_a$ to the initial temperature $T_o$ before it is introduced into the groups of pressure sealed chambers for evaporation. Also, the heated saline water is supplied through the conduit 36 and a temperature mixing distributor component 38 to the chambers 28 of the chamber group 18 at different temperatures between the maximum limit temperature $T_o$ to which the saline water is elevated by the heater 16 and a minimum temperature value $T_n$ for group 18. The mixer component 38 is therefore provided with a plurality of distributing conduits 40 respectively connected to the chambers 28 in the group 18 so as to supply saline water at the different temperatures $T_1$, $T_2$, $T_3$, etc. between the limits indicated. The mixer component 38 supplies saline water at these different temperatures by mixing different proportions of saline water at the elevated temperature $T_o$ supplied thereto by conduit 36 with saline water at the lower temperature $T_a$ supplied to the mixer by the conduit 42. The saline water at the different inlet temperatures $T_o$, $T_1$, $T_2$, $T_3$, . . . $T_n$ is respectively supplied to the chambers 28 of the first group 18 which are maintained at different pressures corresponding to different boiling point temperatures of the saline water respectively less than the inlet temperatures as aforementioned.

It will be apparent therefore that heating of the saline water produces flashing thereof when introduced at the inlet temperatures to the chambers having lower boiling point temperatures. Thus, the bottom chamber 28 for example of the group 18 will be maintained at a maximum pressure $P_o$ so that saline water introduced thereto directly from the conduit 36 at a temperature $T_o$ will be partially evaporated. The next adjacent chamber will be maintained at a lower pressure $(P_{o-d})$ so that saline water introduced thereto under a temperature $T_1$ will also be partially evaporated. Assuming the succeeding chambers are respectively maintained at pressures differing from each other by the same amount $(d)$, the final chamber in group 18 into which saline water is introduced under the temperature $T_n$, will have a minimum pressure of $(P_{o-nd})$. The difference in inlet temperatures is preferably selected to be approximately equal to the drop in temperature between the saline water entering the chamber and its effluent leaving the chamber. For example, the effluent exiting from the chamber under a maximum pressure $P_o$, will be at a temperature $T_1$ which is substantially equal to the inlet temperature of the saline water introduced into the adjacent chamber in the same group. The number of chambers at least in the initial group 18, will therefore depend upon the selected temperature and pressure differentials.

The effluent of the saline water delivered from the respective chambers 28 in the first group 18, is conducted to the chambers in group 20 through parallel conduits which may have manual or automatic valves 44 therein. Each chamber 28 in the first group 18 will be connected with a chamber in the second group 20 which is maintained under a lower boiling point pressure so that further partial evaporation will occur as the liquid passes through the chambers in the second group. The pressure differential between the interconnected chambers may be equal to the same pressure differential between the chambers in the same group as shown in FIGURE 1. Accordingly, the maximum chamber pressure within group 20 will be $(P_{o-d})$ while the minimum chamber pressure will be $[P_{o-(n+1)d}]$. In each succeeding group therefore, the maximum and minimum chamber pressures are reduced with a corresponding reduction in the inlet and outlet temperatures of the remaining liquid. Also, the same number of chambers may be provided in each group until group 22 is reached wherein the chamber having the minimm pressure $P_k$ corresponding to an inlet temperature of $T_k$, will be the lowest practical pressure and temperature respectively to which the system is operationally limited. Thus, each group of chambers following group 22 such as group 24, will have a number of chambers successively reduced by one in view of the lower limiting pressure $P_k$ to successively terminate the parallel paths. When the maximum group chamber pressure reaches the lower limiting pressure $P_k$ as shown in connection with the pressure sealed chamber 26, all paths are terminated. The liquid effluent withdrawn from the final chamber 26 as well as the final chambers associated with the chamber group 22 and the chamber groups which follow, is discharged as waste through the discharge conduit 46.

It will be apparent from the foregoing that the chambers 28 within the respective groups must be maintained at predetermined vacuum pressures in order to produce flashing of the liqid entering at temperatures above the corresponding boiling point temperatures. This is accomplished by interconnecting all chambers having the same pressure with a common condensate withdrawal conduit to thereby maintain chambers of different pressure isolated from each other. Accordingly, there will be a plurality of condensate withdrawal conduits corresponding in number to the number of different pressures associated with the chambers included in the diagrammatically illustrated condensate withdrawal line 48 in FIGURE 1 connected to an outlet pump network 50 by means of which the proper suction pressures are applied to the respective chambers. Also, the proper pressures may be initially established in the respective chambers by a source of vacuum 52 operative through a distributor network 54. Once these pressures are established, the chambers may be disconnected from the source of vacuum and distributor network since the pressures will thereafter be preserved within the chambers by virtue of the regulated inflow and outflow of liquid therethrough and controlled withdrawal of condensate therefrom. The condensate withdrawn from each of the chambers by the outlet pump network 50 will therefore supply distilled water or condensate through conduit 56 to the preheat exchanger 34 from which the end product is withdrawn by means of the conduit 14.

Referring now to FIGURES 2 and 3, the construction of each chamber 28, the walls of which are necessarily imperforate, is shown as well as its arrangement in one of the groups. It will be observed therefore, that the chambers 28 are vertically stacked one on top of another and are disposed at a downward incline for gravity induced flow of liquid from the inlet conduit 58 at the upper inlet side of the chamber to the outlet conduit 60 at the lower outlet side of the chamber. The outlet conduit of a chamber in a preceding group is therefore connected by means of the valve 44 aforementioned to the inlet conduit 58 of a following group. The inlet conduit 58 associated with each chamber may also be connected to a laterally extending manifold 62 formed at the inlet side of the chamber along a wall 64 presenting interiorly of the chamber a flat evaporating surface 66. Liquid will therefore flow downwardly along the evaporating surface when emerging from a plurality of inlet apertures 68 formed in the manifold 62 extending laterally between the side walls 70 and 72 of each chamber. Also formed in laterally spaced relation on the surface 66, are ribs 74 between which flow of liquid is channeled so as to avoid development of any dry spots on the evaporating surface. The pressure within each chamber may be preset by its connection to a source of vacuum through the conduit 76 connected to the inlet side wall 78 opposite the outlet side wall 80 to which the outlet conduit 60 is connected. Also, the wall 64 of each chamber above the lowermost chamber, is provided with a lower condensing surface 82 in heat conductive relation to the upper evaporating surface 66. Thus, the heat energy released by condensation of partially evaporated liquid on the condensing surface 82 of a lower chamber will be transferred to the evaporating surface 66 thereabove so as to augment evaporation of liquid in the chamber with which the evaporating surface 66 is associated. Evaporation in each chamber will therefore occur as a result of the flashing of the liquid entering at a temperature above the boiling point temperature corresponding to the pressure maintained within the chamber and the heat energy transferred to this chamber from the chamber therebelow.

Since each of the walls 64 associated with the chambers is inclined downwardly from the inlet side wall 78 to the outlet side wall 80, the condensate will collect at the outlet side of the chamber within the trough 84 mounted on the outlet side wall 80 in close spaced relation to the condensing surface 82. The condensate trough 84 will therefore conduct condensate collected therein toward a condensate outlet conduit 86 connected to one side wall 72 for example.

When the system is in operation, it is contemplated that it will reach a state of equilibrium wherein the volume of liquid admitted in the form of saline water for example will equal the volume of liquid extracted as the end product plus the waste product. Also, the amount of liquid being converted into vapor within the chamber will be equal to the amount of vapor condensed into liquid as condensate. In view of this balance, the pressures to which the chambers are initially preset will be maintained. Thus, the arrangement of the present invention permits the reuse of heat initially supplied to the liquid in order to extract the maximum amount of condensate.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for the recovery of potable distillate from saline water comprising, a plurality of pressure sealed chambers vertically stacked one on top of another, each of said chambers having spaced imperforate walls respectively presenting a flat vertically inclined evaporating surface and a condensing surface, means comprising a manifold having a plurality of inlet apertures therein for conducting a regulated gravity flow of said saline water over said evaporating surfaces to partially evaporate the saline water in each of the chambers, the evaporating and condensing surfaces of adjacent chambers being in heat conductive relation to each other, means maintaining different pressures within said adjacent chambers for evaporation of the saline water at different boiling temperatures, conduit means sequentially conducting effluent of the saline water from a preceding chamber at an exit temperature higher than the boiling temperature in a following chamber to which the effluent is delivered, and means for withdrawing condensate from the condensing surfaces of the chambers.

2. The combination of claim 1 wherein said means maintaining different pressures within the chambers comprises condensate withdrawal conduits respectively connected to the chambers, outlet pump means connected to said conduits for applying suction pressures to the chambers, and vacuum pressure distributing means connected to the respective chambers for initially establishing said different pressures.

3. Apparatus for the recovery of potable distillate from saline water comprising, a plurality of pressure sealed chambers, each of said chambers having spaced, imperforate walls respectively presenting a flat vertically inclined evaporating surface and a condensing surface, means for conducting a regulated flow of said saline water over said evaporating surfaces to partially evaporate the saline water in each of the chambers, the evaporating and condensing surfaces of adjacent chambers being in heat conductive relation to each other, means maintaining different pressures within said adjacent chambers for evaporation of the saline water at different boiling temperatures, conduit means sequentially conducting effluent of the saline water from a preceding chamber at an exit temperature higher than the boiling temperature in a following chamber to which the effluent is delivered, and means for withdrawing condensate from the condensing surfaces of the chambers, each of said chambers including an inlet side and an outlet side between which a lower one of said spaced walls extends at a downward incline presenting the evaporating surface, a laterally extending manifold mounted on the lower wall at the inlet side having a plurality of inlet apertures, a condensate collection trough mounted in spaced relation above the lower wall at the outlet side and a plurality of spaced ribs formed on the lower wall extending from the inlet side to the outlet side.

4. A system for recovering distillate from a source of liquid comprising, a group of vertically stacked chambers, each chamber having a downwardly inclined, imperforate evaporating surface in heat conductive relation to an imperforate condensing surface in an adjacent chamber, means for maintaining the chambers in said group at different predetermined pressures between maximum and minimum values having corresponding boiling temperatures with respect to said liquid, heating means for elevating the temperature of said liquid to a value exceeding the maximum boiling temperature associated with the chambers, temperature controlled distributing means connected to the heating means for supplying liquid to the chambers at inlet temperatures respectively exceeding the respective boiling temperatures and outlet pump means for withdrawing condensate from the respective chambers under substantially the same differential pressures, each of said chambers including a bottom wall on which the evaporating surface is formed downwardly inclined from an inlet side to an outlet side, a laterally extending manifold mounted on the bottom wall at the inlet side having a plurality of inlet apertures, a condensate collection trough mounted in spaced relation above the bottom wall at the outlet side and a plurality of spaced ribs formed on the bottom wall extending from the inlet side to the outlet side.

5. The combination of claim 4 including additional groups of chambers, conduit means connecting the chambers in preceding groups with chambers in following groups in parallel for sequential flow of liquid effluent, the chambers of each preceding group being at a higher pressure than the chambers of the following group with which they are interconnected, the number of chambers in each group and the number of groups being dependent upon the lowest limit boiling temperature of the liquid and the difference in pressures between the chambers.

References Cited

UNITED STATES PATENTS

| | | | |
|---|---|---|---|
| 3,004,590 | 10/1961 | Rosenblad | 159—13 |
| 3,146,177 | 8/1964 | Chalmers et al. | 202—160 |
| 3,152,053 | 10/1964 | Lynam | 202—173 |
| 3,180,805 | 4/1965 | Chirico | 202—173 |
| 3,192,132 | 6/1965 | Loebel | 202—173 |
| 3,275,530 | 9/1966 | Akers | 202—174 |
| 3,275,532 | 9/1966 | Harper | 203—11 |
| 3,291,704 | 12/1966 | Diedrich et al. | 203—10 X |
| 3,337,419 | 8/1967 | Kogan | 202—185 X |
| 3,285,832 | 11/1966 | Sephton | 203—11 X |
| 3,298,932 | 1/1967 | Bauer | 203—11 |
| 3,356,592 | 12/1967 | Eubank et al. | 203—11 |

OTHER REFERENCES

"Flash Evaporators for the Distillation of Sea-Water" by A. Frankel, published by The Institution of Mechanical Engineers, London (1959), pp. 3-6 and 9.

NORMAN YUDKOFF, Primary Examiner

F. E. DRUMMOND, Assistant Examiner

U.S. Cl. X.R.

159—13; 203—7, 10